United States Patent
Lahmer et al.

(10) Patent No.: US 10,107,194 B2
(45) Date of Patent: Oct. 23, 2018

(54) GAS TURBINE

(71) Applicant: MTU Aero Engines AG, Munich (DE)

(72) Inventors: Manfred Lahmer, Eichenau (DE); Harsimar Sahota, Garching (DE)

(73) Assignee: MTU Aero Engines AG, Munich (DE)

( * ) Notice: Subject to any disclaimer, the term of this patent is extended or adjusted under 35 U.S.C. 154(b) by 558 days.

(21) Appl. No.: 14/563,868

(22) Filed: Dec. 8, 2014

(65) Prior Publication Data

US 2015/0159551 A1 Jun. 11, 2015

(30) Foreign Application Priority Data

Dec. 9, 2013 (EP) ..................................... 13196267

(51) Int. Cl.
*F02C 6/08* (2006.01)
*F01D 17/16* (2006.01)
(Continued)

(52) U.S. Cl.
CPC ................ *F02C 6/08* (2013.01); *F01D 17/16* (2013.01); *F01D 17/162* (2013.01); *F02C 9/18* (2013.01);
(Continued)

(58) Field of Classification Search
CPC .. F02C 6/08; F02C 9/18; F04D 29/545; F04D 29/563; F01D 17/16; F01D 17/162; F01D 9/065; Y02T 50/671
See application file for complete search history.

(56) References Cited

U.S. PATENT DOCUMENTS 4,395,195 A 7/1983 De Cosmo et al.
6,327,844 B1 12/2001 Kaminske
(Continued)

FOREIGN PATENT DOCUMENTS

EP 1 801 403 6/2007
EP 2 055 961 5/2009
(Continued)

OTHER PUBLICATIONS

Conan et al, Bleed Airflow CFD Modeling in Aerodynamics Simulations of Jet Engine Compressors, Proceedings of ASME Turbo Expo (2001).
(Continued)

*Primary Examiner* — Dwayne J White
*Assistant Examiner* — Adam W Brown
(74) *Attorney, Agent, or Firm* — Davidson, Davidson & Kappel, LLC

(57) ABSTRACT

A gas turbine stage, in particular to an aircraft gas turbine. This gas turbine includes at least one casing having at least one bleed duct and at least one bore, and further includes at least one variable guide vane having a trunnion, a rotary plate, and a guide vane airfoil. The trunnion is disposed in the bore, and the guide vane airfoil is integrally formed with the rotary plate. The guide vane airfoil integrally formed with the rotary plate extends beyond this rotary plate in such a way that, viewed in the direction of flow of the gas path of the gas turbine, a flag corner of the guide vane airfoil, which corner faces the bleed duct and/or is in particular a virtual one, is located downstream of the beginning of the inlet opening of the bleed duct.

22 Claims, 4 Drawing Sheets

(51) Int. Cl.
*F02C 9/18* (2006.01)
*F04D 29/56* (2006.01)
*F04D 29/54* (2006.01)

(52) U.S. Cl.
CPC ......... *F04D 29/545* (2013.01); *F04D 29/563* (2013.01); *Y02T 50/671* (2013.01)

(56) References Cited

U.S. PATENT DOCUMENTS

| | | | |
|---|---|---|---|
| 7,891,943 B2* | 2/2011 | Tsuchiya | F01D 5/141 |
| | | | 415/195 |
| 7,966,831 B2 | 6/2011 | Kraft et al. | |
| 8,043,046 B2* | 10/2011 | Guemmer | F04D 29/681 |
| | | | 415/115 |
| 2011/0072829 A1* | 3/2011 | Bil | F02C 9/18 |
| | | | 60/785 |
| 2014/0075956 A1 | 3/2014 | Patsouris | |

FOREIGN PATENT DOCUMENTS

| | | |
|---|---|---|
| EP | 2 518 273 | 10/2012 |
| GB | 2 455 863 | 7/2008 |
| WO | WO 2012/164224 | 12/2012 |

OTHER PUBLICATIONS

"Bleed Air", Wikipedia, https://en.wikipedia.org/wiki/Bleed_air, downloaded on Dec. 18, 2017.

* cited by examiner

GAS TURBINE

This claims the benefit of European Patent Application EP 13196267.2, filed Dec. 9, 2013 and hereby incorporated by reference herein.

The present invention relates to a gas turbine.

BACKGROUND

An example of known gas turbines is shown, for example, in FIG. 1. FIG. 1 shows a sectional view of a gas turbine at the outer gas path. The gas turbine has a casing 1 having a bore 2 and a bleed duct 3. This substantially horizontally extending casing 1 separates the lower region (primary gas path 10) from the upper region (secondary gas path 12). In this view, the working fluid (here gas) flows from left to right. A variable guide vane 4 has a trunnion 5, a rotary plate 6, and a guide vane airfoil 7. Trunnion 5 is disposed in bore 2 and retained by a guide sleeve 8 disposed in bore 2. A sealing ring 9 is disposed between bore 2 and rotary plate 6. Guide vane airfoil 7 has a leading edge 14 and a trailing edge 16 in accordance with the prior art. Leading edge 14 mostly does not extend beyond rotary plate 6. In contrast, trailing edge 16 extends beyond rotary plate 6, so that a short flag 18 is created. The point at which flag 18 and trailing edge 16 meet is referred to as flag corner 20. An inlet opening 22 of bleed duct 3 is disposed downstream of this known trailing edge of guide vane airfoil 7. This means that in the prior art, the beginning 24 of inlet opening 22 is located aft of flag corner 20. In this connection, it is irrelevant whether the overhang beyond rotary plate 6 is small, or whether the beginning 24 of inlet opening 22 is located further downstream.

A first outer surface 30 of the annular space can be seen upstream of bore 2. First outer surface 30 is located at a first radius $r_1$ from main shaft 60 (see FIG. 3) of the gas turbine. A second outer surface 32 can be seen between bore 2 and inlet opening 22 of bleed duct 3. A third outer surface 34 of the annular space can be seen downstream of inlet opening 22, the third outer surface mostly being disposed in alignment with second outer surface 32 (as indicated by connecting line V). In the prior art, there is a continuous transition between these three outer surfaces; i.e., the annular space is mostly cylindrical or conical in shape at these locations.

Such bleed ducts 3 serve to direct fluid from primary gas path 10 to secondary gas path 12. It must be ensured that sufficient fluid is directed through bleed duct 3 at sufficient pressure.

SUMMARY OF THE INVENTION

The known approach has the disadvantage that the guide vane airfoils must have an appropriate minimum length to cause sufficient air to be diverted by the variable guide vanes. Because of this, the inlet openings of the bleed ducts must be located further downstream. As a result, the gas turbine has a long overall length, which increases its weight. Moreover, the inlet openings of the bleed ducts can be designed for only one operating point of the gas turbine.

It is an object of the present invention to provide a gas turbine design that is shorter and lighter in weight than is known in the prior art.

The present invention relates to a gas turbine stage, in particular to an aircraft gas turbine. This gas turbine includes at least one casing having at least one bleed duct and at least one bore, and further includes at least one variable guide vane having a trunnion, a rotary plate, and a guide vane airfoil. The trunnion is disposed in the bore, and the guide vane airfoil is integrally formed with the rotary plate. The guide vane airfoil integrally formed with the rotary plate extends beyond this rotary plate in such a way that, viewed in the direction of flow of the gas path of the gas turbine, a flag corner of the guide vane airfoil, which corner faces the bleed duct and/or is in particular a virtual one, is located aft, or downstream, of the beginning of the inlet opening of the bleed duct.

The flag corner may also be rounded. Other shapes are also possible. A so-called virtual flag corner may be located downstream of the beginning of the inlet opening of the bleed duct. The point of intersection between a first tangent extending through the flag and a second tangent extending through the trailing edge of the airfoil forms the virtual flag corner, which, in particular, faces the bleed duct. The exact location of the second, radially further inward flag corner (not shown in FIG. 2) is of no importance to the present invention. Thus, the flag corner that is not shown faces away from the bleed duct. The length of the gas turbine can thus be shortened without having to change the flag length of the variable guide vanes. The reduction in length correspondingly reduces the weight of the gas turbine.

In an advantageous embodiment of the present invention, the bore is located upstream of the bleed duct, as viewed in the direction of flow of the gas path of the gas turbine. This allows for a substantially turbulent-free flow onto the variable guide vane.

In another advantageous embodiment of the present invention, the first circumferential angle between a vertical line and the bore is equal to the second circumferential angle between the vertical line and the inlet opening of the bleed duct.

When looking at the gas turbine in the direction of the main shaft, this shaft extends perpendicularly to the viewing plane (see FIG. 3). The vertical line mentioned in the claims extends from the outer surface of the annular space at the twelve o'clock position through the main shaft of the gas turbine. If the bore is located, for example, at the one o'clock position in the circumferential direction, then the inlet opening is also located at the one o'clock position, because both have the same circumferential angle with respect to this vertical line. This has the advantage that gas can be tapped off directly downstream of the variable guide vane and directed to the secondary gas path, especially when the variable guide vane assumes the smallest opening angle $\beta$.

In another advantageous embodiment of the present invention, the outer surface of the annular space between the bore and the inlet opening of the bleed duct has a different radius than the outer surface of the annular space downstream of the inlet opening of the bleed duct. This makes it possible to provide an optimal design for the pressure conditions in the bleed duct. The outer surface of the annular space between the bore and the inlet opening will be referred to in short as the second outer surface hereinafter. The outer surface of the annular space downstream of the inlet opening will be referred to in short as the third outer surface hereinafter.

In another advantageous embodiment of the present invention, the outer surface of the annular space between the bore and the inlet opening of the bleed duct has a larger radius than a lip located downstream of the inlet opening of the bleed duct. This lip extends the end of the inlet opening radially in such a way that the bleed duct extends radially inwardly, preferably abruptly, so that it overlaps the upper region of the guide vane airfoil in a radial direction. In this way, it can be ensured that the air in the upper portion of the gas path flows along the variable guide vane and is pressed into the bleed duct at the lip in order to direct some air from the primary gas path to the secondary gas path.

In another advantageous embodiment of the present invention, a first axial distance D exists between the beginning and the trailing edge. B represents the axial length of the flag. The ratio D/B is between 0.25 and 0.90, preferably between 0.35 and 0.55, and indicates the axial portion of the flag that is located below the inlet opening.

In a further advantageous embodiment of the present invention, a first axial distance D exists between the beginning and the trailing edge. A second axial distance C exists between the beginning and an end of the inlet opening. The ratio D/C is between 0.15 and 0.45, preferably between 0.25 and 0.35, and indicates the axial portion of the inlet opening that is covered by the flag.

In a further advantageous embodiment, a first radius $r_1$ exists between a main shaft of the gas turbine and the outer casing, and a second axial distance C exists between the beginning and an end of the inlet opening, and wherein the ratio $r_1/C$ is between 0 and 0.6, preferably between 0.2 and 0.45.

In another advantageous embodiment of the present invention, the lip is radially displaceable. The displaceability of the lip serves to allow the bleed pressure at the bleed opening to be suitably adjusted to the operating points of the gas turbine. Displacement of the lip may be accomplished, for example, by active clearance control (ACC).

A further advantageous embodiment of the present invention provides that, viewed in the direction of flow of the gas path of the gas turbine, the flag corner of the guide vane airfoil is located downstream of the beginning of the inlet opening of the bleed duct when opening angle β of the variable guide vane is between 0° and 60°, in particular between 15° and 45°. Another advantageous range for opening angle β is between 20° and 35°. This has the advantage that the flag of the guide vane airfoil does not need to extend radially downward in order not to get caught on the casing as the variable guide vane is rotated. The flag then can extend into the bleed duct, and thus can be given an aerodynamically better design.

In another advantageous embodiment of the present invention, the region of the flag near a rotary plate of the variable guide vane has a smaller radius than the flag corner and/or the same radius as the flag corner.

This advantageously allows the flag clearance to be optimized. The flag clearance is the distance between the second outer surface and the flag. Further, the flag corner may even have a larger radius than the second outer surface, so that the flag corner extends into the bleed duct.

In a further advantageous embodiment of the present invention, the inlet opening is circular, square or rectangular in shape, or a circumferential groove. Moreover, the bleed duct may be cylindrical, conical or cuboidal in shape. Furthermore, the corners of the inlet openings may be rounded.

In another advantageous embodiment of the present invention, a plurality of variable guide vanes form a guide vane ring, and two variable guide vanes have a different angular spacing than two other variable guide vanes within the guide vane ring. Such an arrangement is referred to as "cyclic spacing." For example, in a longitudinally divided casing, eighteen variable guide vanes may be disposed in the upper half, and nineteen variable guide vanes may be disposed in the lower half.

BRIEF DESCRIPTION OF THE DRAWINGS

Preferred exemplary embodiments of the present invention will now be described with reference to the schematic drawings, in which.

DETAILED DESCRIPTION

Figure 2:
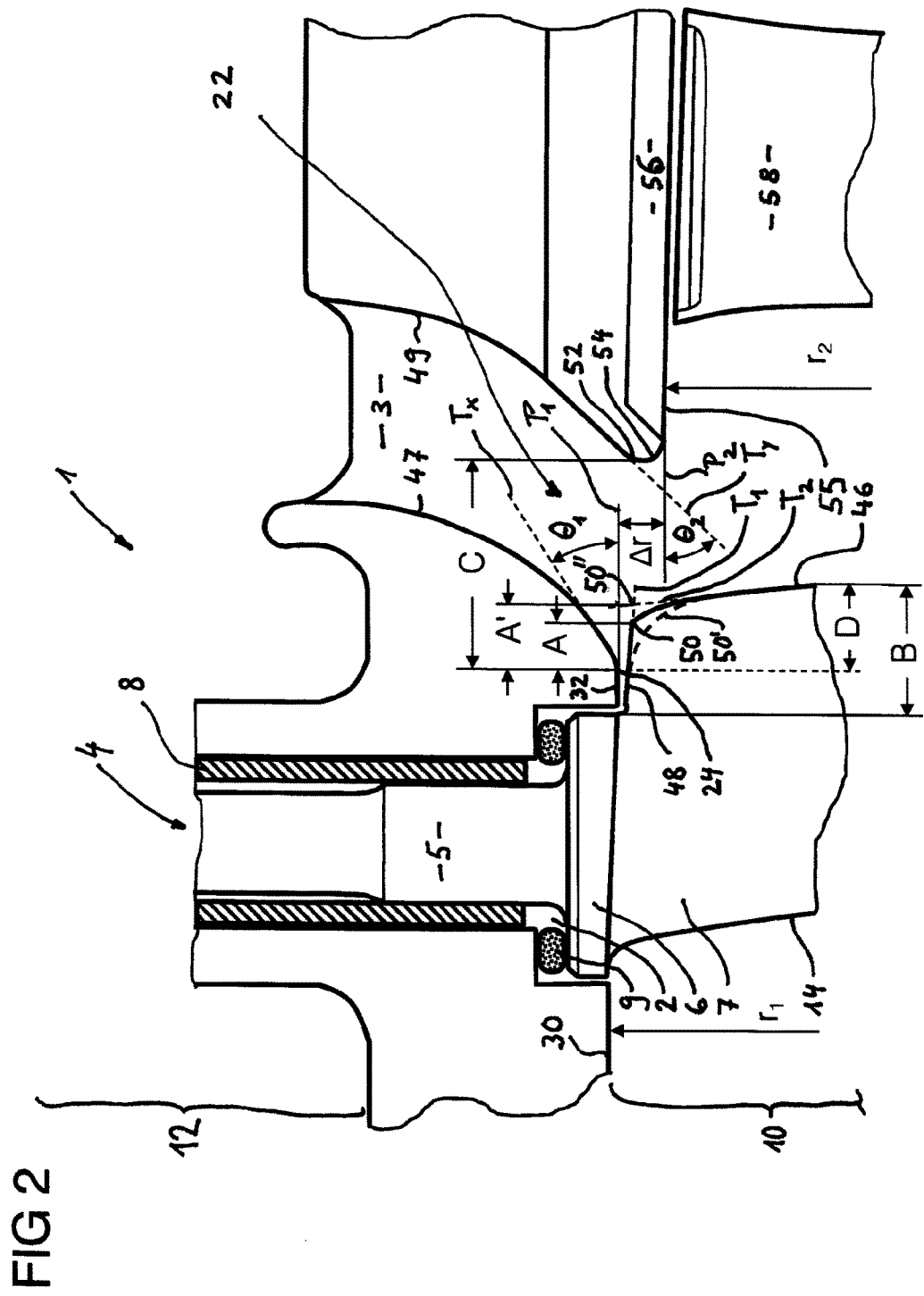
FIG. 2 is a longitudinal section through the upper portion of a gas turbine in accordance with an embodiment of the present invention.

FIG. 2 shows a longitudinal section through the upper portion of a gas turbine in accordance with an embodiment of the present invention.

Figure 1:
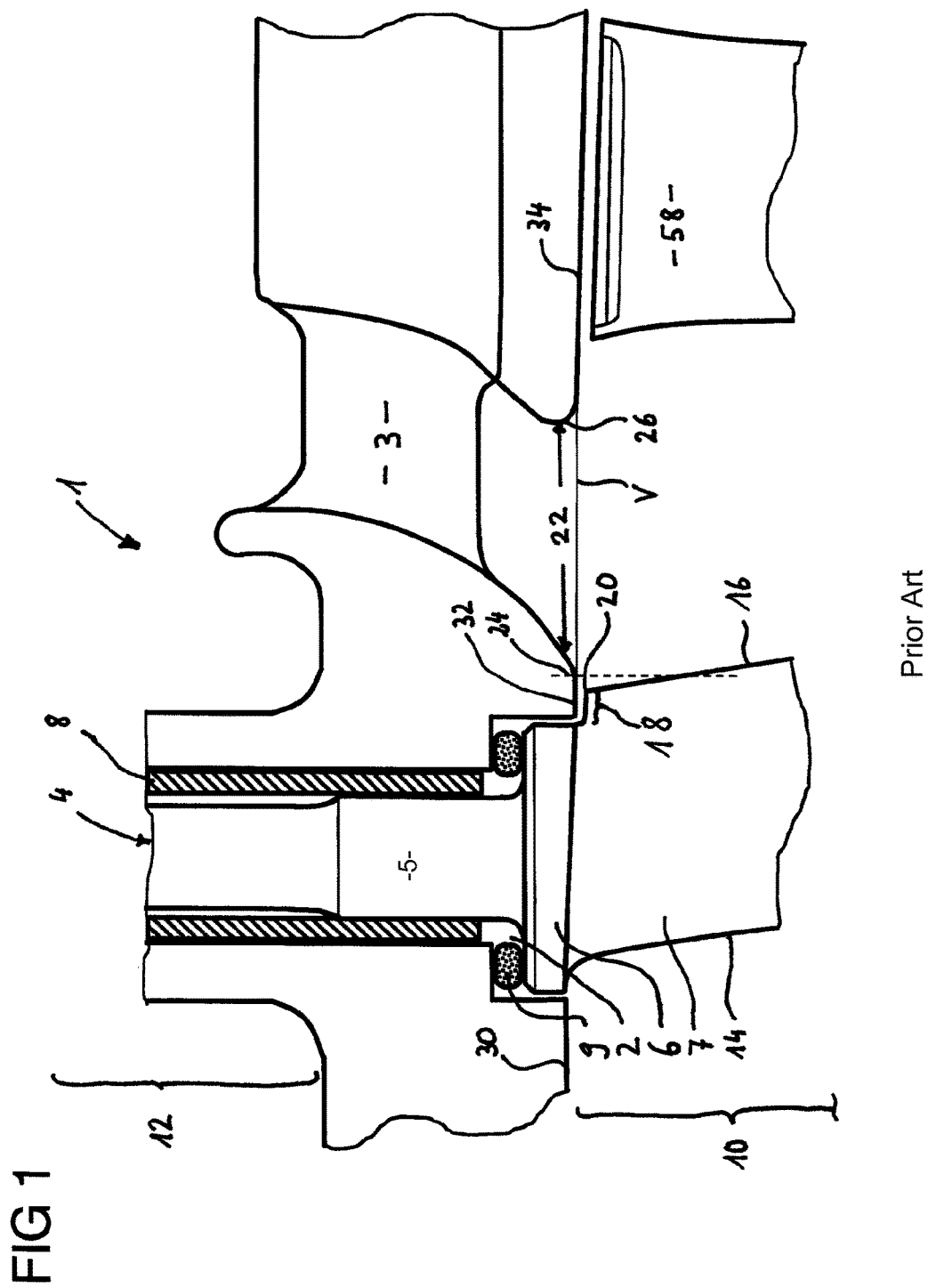
FIG. 1 is a longitudinal section through the upper portion of a gas turbine in accordance with the prior art.

The prior art illustrated in FIG. 1 has already been discussed in the introductory part of this specification. In the following, only the differences will be pointed out. In contrast to the prior art, the embodiment of guide vane airfoil 7 according to the present invention may have a different trailing edge 46, so that the flag 48 according to the present invention may be longer than the flag 18 known from the prior art. An axial distance B between the edge of rotary plate 6 and trailing edge 46 of guide vane airfoil 7 represents the axial length B of flag 48. Flag 48 according to the present invention and trailing edge 46 according to the present invention meet in flag corner 50 according to the present invention. In another embodiment (shown by a dashed line), flag corner 50' may also be rounded. Other shapes are also possible. The so-called virtual flag corner 50" should be located downstream of beginning 24 of inlet opening 22 of bleed duct 3. The point of intersection between a first tangent $T_1$ extending through flag 48 and a second tangent $T_2$ extending through trailing edge 46 of airfoil 7 forms the virtual flag corner 50", which, in particular, faces the bleed duct 3. The exact location of the second, radially further inward flag corner (not shown in FIG. 2) is of no importance to the present invention. It should be noted that flag corner 50 and rounded flag corner 50' both have the same virtual flag corner 50".

Flag corner 50 (respectively 50") according to the present invention is rearwardly offset by a certain distance A (respectively A') from beginning 24 of inlet opening 22, so that a portion of flag 48 is overlapped by inlet opening 22. The beginning 24 is understood to be the point of intersection between second outer surface 32 and the forward boundary 47 of bleed duct 3. In FIG. 2, a first axial distance D is indicated to represent the axial length between beginning 24 and trailing edge 46. Also indicated in FIG. 2 is second axial distance C, which represents the axial length between beginning 24 and end 52 of inlet opening 22. Forward boundary 47 may have a first opening angle Θ of from 30° to 60° with respect to engine axis 60 or an axis $P_1$ parallel thereto. This refers to the angle between straight line $P_1$ and tangent $T_x$, which is indicated by a dashed line at forward boundary 47. In the exemplary embodiment of FIG. 2, first opening angle $\Theta_1$ is ≈35°.

A downstream, rearward boundary 49 of bleed duct 3 merges into end 52 of inlet opening 22 and may have a second opening angle $\Theta_2$ of from 30° to 60° with respect to engine axis 60 or an axis $P_2$ parallel thereto. This refers to the angle $\Theta_2$ between straight line $P_2$ and tangent $T_y$, which is indicated by a dashed line at rearward boundary 49. In the exemplary embodiment of FIG. 2, second opening angle $\Theta_2$ is ≈50°.

It is noted that in FIG. 1, variable guide vane 5 assumes the smallest opening angle β of 0° for the sake of better illustration. However, variable guide vanes 4 and 4' can typically only assume an opening angle β of at least 6°; i.e., the variable guide vane is always at a slight angle relative to the oncoming flow. Alternatively to or in combination with flag corner 50, 50', 50", a portion of trailing edge 46, or the entire trailing edge 46, may be disposed aft, or downstream, of beginning 24 of inlet opening 22.

Furthermore, the inventive end 52 of inlet opening 22 is configured differently than the end 26 according to the prior art. The end 52 according to the present invention may be radially inwardly offset from the known end 26 by distance Δr, thereby forming lip 54. Downstream of lip 54 is a third outer surface 55 having an abradable lining 56 therein. Outer surface 55 is located at a second radius $r_2$ from main shaft 60. Thus, distance Δr is defined as follows: $\Delta r = r_1 - r_2$. A rotor blade 58 can be seen below abradable lining 56. Lip 54 may be radially displaceable. Typically, guide vane airfoil 7 is configured in the outer portion of the annular space in such a way that, in combination with bleed duct 3 and the shape and radial position of lip 54, the required delivery pressure is ensured in bleed duct 3.

Figure 3:
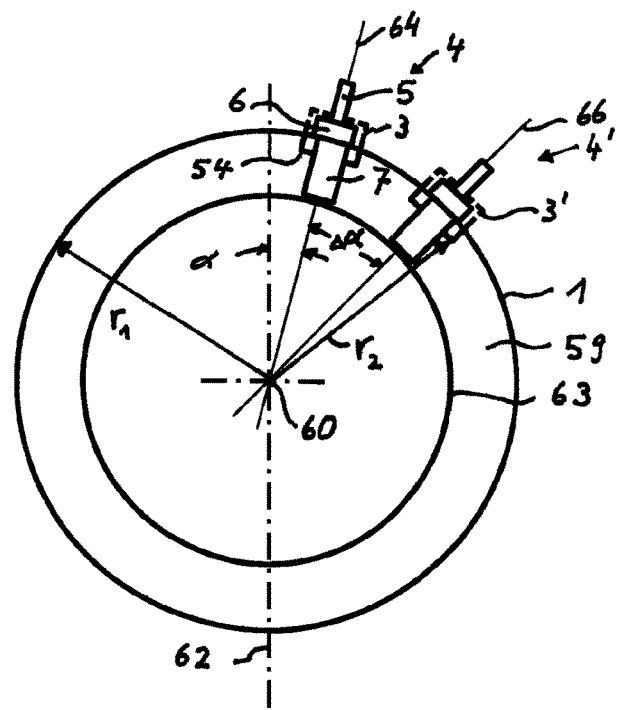
FIG. 3 is a transverse section through the gas turbine.

FIG. 3 shows a transverse section through a gas turbine, depicting only two variable guide vanes 4 and 4' and two bleed ducts 3 and 3' by way of example. The gas is directed from the front through the plane of the paper. In this figure, outer casing 1 is shown along with variable guide vane 4, including trunnion 5, rotary plate 6, and guide vane airfoil 7. Of course, more than two variable guide vanes 4 and 4' may be disposed about the circumference of casing 1. Outer casing 1 has a first radius $r_1$. In the inner region of the gas turbine, variable guide vanes 4 and 4' are bounded by inner casing 63, so that a guide vane ring 59, here including two variable guide vanes 4 and 4', is formed between outer casing 1 and inner casing 63. A vertical line 62 is drawn through main shaft 60 of the gas turbine. Also indicated are the axes of rotation 64 and 66 of variable guide vanes 4 and 4'. Axis of rotation 64 and vertical line 62 form an angle α (here 15°). This corresponds to the one o'clock position of a clock. Bleed duct 3 is disposed downstream, or aft, of variable guide vane 4 at the same angle to vertical line 62. It can be seen that lip 54 extends radially inwardly, overlapping the upper portion of guide vane airfoil 7. Lip 54 has a second radius $r_2$. It can be seen from FIG. 3 that first radius $r_1$ is larger than second radius $r_2$. Here, bleed duct 3 is, by way of example, rectangular in shape.

Figure 5:
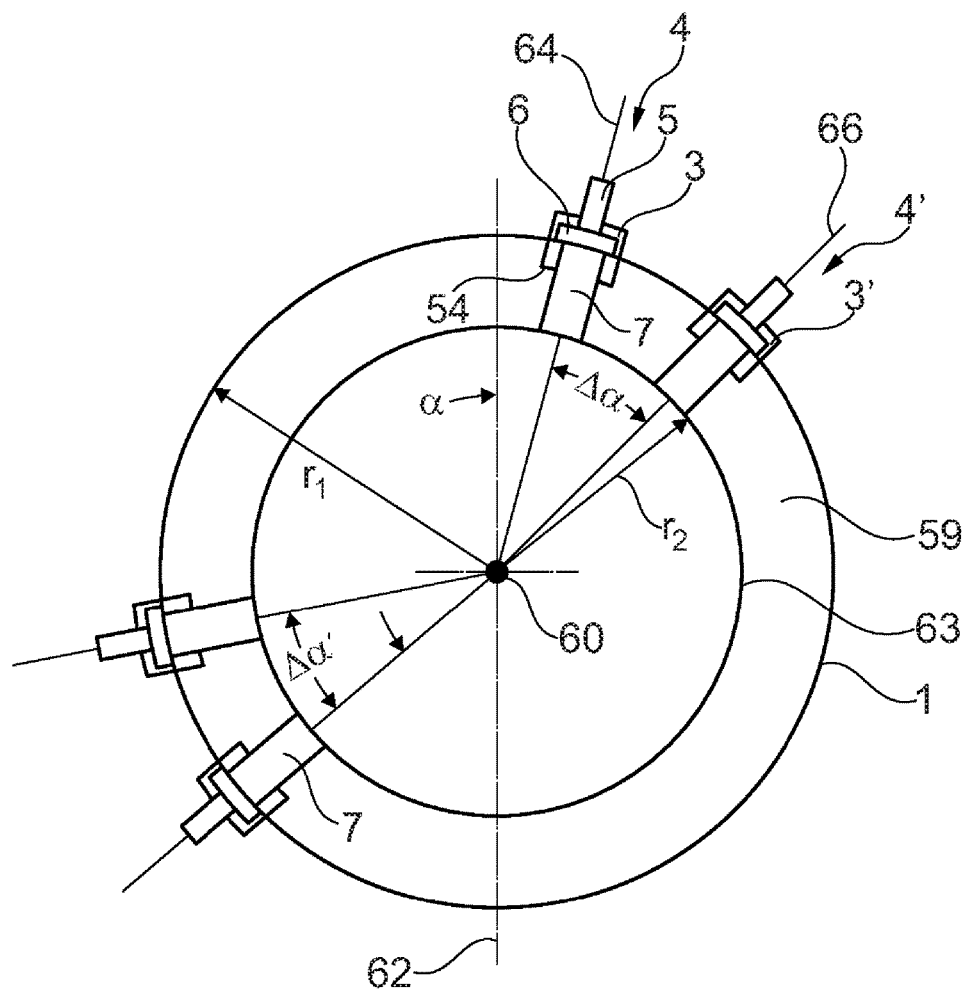
FIG. 5 shows a transverse section through the gas turbine of FIG. 3, modified to have first angular spacings Δα differ from the second angular spacings Δα'.

Axis of rotation 66 of second variable guide vane 4' and vertical line 62 form an angle of 45° here. The angular spacing Δα indicates the angle between axis of rotation 64 and axis of rotation 66. Here, this angular spacing Δα is 30°. All axes of rotation may have the same angular spacing from each other. In a preferred embodiment, the angular spacings may continuously decrease. In another embodiment, the angular spacings are identical in one segment of a guide vane ring 59. In another segment, the angular spacings are also identical; however, the first angular spacings Δα differ from the second angular spacings Δα' (FIG. 5). Guide vane ring 59 may be divided into two, three or four (or more) segments of equal size.

Figure 4:
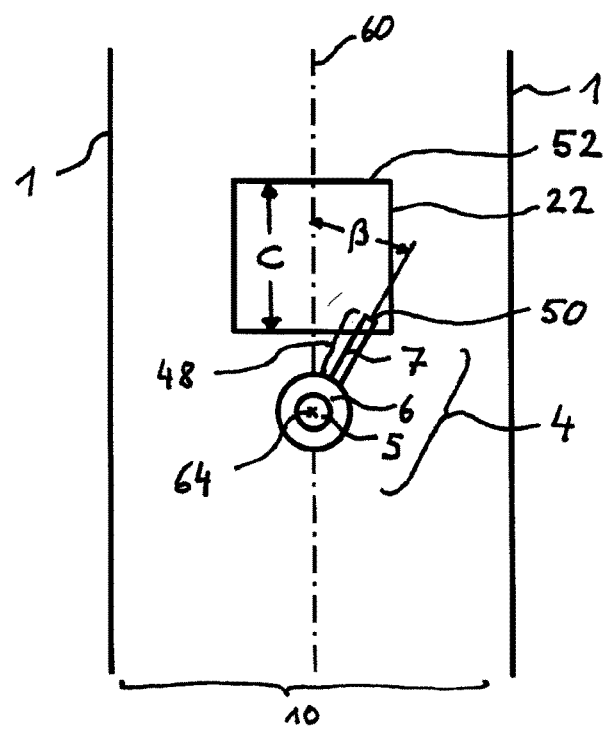
FIG. 4 is a top view of the gas turbine, looking along the axis of rotation of the variable guide vane.

FIG. 4 shows a top view of the gas turbine, looking along axis of rotation 64 of variable guide vane 4. In this view, the gas flow is from bottom to top. Here, the vertically extending primary gas path 1 is bounded at the left and right outer sides by casing 1. Main shaft 60 of the gas turbine extends centrally in a vertical direction. An inlet opening 22 (here, by way of example, rectangular) of bleed duct 3 (not shown) can be seen in the upper region of primary gas path 1. The lower edge of the rectangle forms the beginning 24 of inlet opening 22, and the upper edge of the rectangle forms the inventive end 52 of inlet opening 22. Variable guide vane 4, including a trunnion 5, a rotary plate 6, and a guide vane airfoil 7 integrally formed therewith, can be seen below inlet opening 22. The flag 48 according to the present invention extends beyond rotary plate 6. Flag corner 50, respectively 50", according to the present invention is located below inlet opening 22. Guide vane airfoil 7 is rotatably mounted about axis of rotation 64. Guide vane airfoil 7 and main shaft 60 form an opening angle β. In this figure, opening angle β is 30°. However, if guide vane airfoil 7 (i.e., the chord thereof) is located on main shaft 60 in this view, then the variable guide vane has an opening angle β of 0°.

Preferably, such variable guide vanes 4 and the corresponding bleed ducts 3 are located in the high-pressure compressor of a gas turbine.

LIST OF REFERENCE NUMERALS

1 outer casing
2 bore
3, 3' bleed duct
4, 4' variable guide vane
5 trunnion
6 rotary plate
7 guide vane airfoil
8 guide sleeve
9 sealing ring
10 primary gas path
12 secondary gas path
14 leading edge
16 trailing edge in accordance with the prior art
18 flag in accordance with the prior art
20 flag corner in accordance with the prior art
22 inlet opening
24 beginning of 22
30 first outer surface of 1
32 second outer surface of 1
34 third outer surface in accordance with the prior art
46 trailing edge in accordance with the present invention
47 forward boundary
48 flag in accordance with the present invention
49 rearward boundary
50 flag corner in accordance with the present invention
50' rounded flag corner
50" virtual flag corner
52 end of 22 in accordance with the present invention
54 lip
55 third outer surface in accordance with the present invention
56 abradable lining
58 rotor blade
59 guide vane ring
60 main shaft of the gas turbine
62 vertical line
63 inner casing
64 axis of rotation of 4
A, A' distance (between 24 and 50, respectively 50")
B axial length of 48
C second axial distance (between 24 and 52)

D first axial distance (between 24 and 46)
$P_{1,2}$ axes parallel to the engine axis
$r_1$ radius of 30
$r_2$ radius of 55
$\Delta r$ distance $(r_1-r_2)$
$T_1$ first tangent of 48
$T_2$ second tangent of 46
V connecting line between 24 and 26
$\alpha$ circumferential angle
$\Delta\alpha$ angular spacing
$\beta$ opening angle
$\Theta_1$ first opening angle of 47
$\Theta_2$ second opening angle of 49

What is claimed is:

1. A gas turbine comprising:
at least one casing provided with at least one bleed duct and at least one bore;
at least one variable guide vane having a trunnion, a rotary plate, and a guide vane airfoil, the trunnion being disposed in the bore, and the guide vane airfoil being integrally formed with the rotary plate,
the guide vane airfoil extending beyond the rotary plate in such a way that, viewed in a direction of flow of the gas path of the gas turbine, a flag corner of the guide vane airfoil facing the bleed duct is located downstream of a beginning of the inlet opening of the bleed duct, wherein the bleed duct connects a primary gas path to a secondary gas path; and
at least one rotor blade located downstream of the guide vane, the at least one casing separating the primary flow path from the secondary flow path, the primary flow path and the secondary flow path extending axially past the at least one guide vane and the at least one rotor blade vane.

2. The gas turbine as recited in claim 1 wherein the bore is located upstream of the bleed duct.

3. The gas turbine as recited in claim 1 wherein a first circumferential angle between a vertical line and the bore is equal to the second circumferential angle between the vertical line and the inlet opening of the bleed duct.

4. A gas turbine comprising:
at least one casing provided with at least one bleed duct and at least one bore; and
at least one variable guide vane having a trunnion, a rotary plate, and a guide vane airfoil, the trunnion being disposed in the bore, and the guide vane airfoil being integrally formed with the rotary plate,
the guide vane airfoil extending beyond the rotary plate in such a way that, viewed in a direction of flow of the gas path of the gas turbine, a flag corner of the guide vane airfoil facing the bleed duct is located downstream of a beginning of the inlet opening of the bleed duct;
wherein an outer surface of the annular space between the bore and the inlet opening of the bleed duct has a different radius than an outer surface of the annular space downstream of the inlet opening of the bleed duct.

5. A gas turbine comprising:
at least one casing provided with at least one bleed duct and at least one bore; and
at least one variable guide vane having a trunnion, a rotary plate, and a guide vane airfoil, the trunnion being disposed in the bore, and the guide vane airfoil being integrally formed with the rotary plate,
the guide vane airfoil extending beyond the rotary plate in such a way that, viewed in a direction of flow of the gas path of the gas turbine, a flag corner of the guide vane airfoil facing the bleed duct is located downstream of a beginning of the inlet opening of the bleed duct;
wherein an outer surface of the annular space between the bore and the inlet opening of the bleed duct has a larger radius than a lip located downstream of the inlet opening of the bleed duct.

6. The gas turbine as recited in claim 1 wherein a first axial distance D exists between a beginning and a trailing edge of the guide vane, and B represents an axial length of the flag, and wherein the ratio D/B is between 0.25 and 0.90.

7. The gas turbine as recited in claim 6 wherein the ratio D/B is between 0.35 and 0.55.

8. The gas turbine as recited in claim 1 wherein a first axial distance D exists between a beginning and a trailing edge of the guide vane, and a second axial distance C exists between the beginning and an end of the inlet opening, and wherein the ratio D/C is between 0.15 and 0.45.

9. The gas turbine as recited in claim 8 wherein the ratio D/C is between 0.25 and 0.35.

10. The gas turbine as recited in claim 1 wherein a first radius $r_1$ exists between a main shaft of the gas turbine and the outer casing, and a second axial distance C exists between the beginning and an end of the inlet opening, and wherein the ratio $r_1/C$ is between 0 and 0.6.

11. The gas turbine as recited in claim 10 wherein the ratio $r_1/C$ is between 0.2 and 0.45.

12. The gas turbine as recited in claim 1 wherein, viewed in the direction of flow of the gas path of the gas turbine, the flag corner of the guide vane airfoil is located downstream of the beginning of the inlet opening of the bleed duct when the opening angle of the variable guide vane is between 0° and 60°.

13. The gas turbine as recited in claim 12 wherein the opening angle is between 15° and 40°.

14. The gas turbine as recited in claim 1 wherein a region of the flag near the rotary plate of the variable guide vane has a smaller radius than the flag corner or the same radius as the flag corner.

15. The gas turbine as recited in claim 1 wherein the inlet opening is circular, square or rectangular in shape, or a circumferential groove, or the bleed duct is cylindrical, conical or cuboidal in shape.

16. The gas turbine as recited in claim 1 wherein a plurality of variable guide vanes of the at least one guide vane form a guide vane ring, and wherein two of the plurality of variable guide vanes have a different angular spacing than two other variable guide vanes of the plurality of guide vanes within the guide vane ring.

17. A gas turbine comprising:
at least one casing provided with at least one bleed duct and at least one bore;
at least one variable guide vane having a trunnion, a rotary plate, and a guide vane airfoil, the trunnion being disposed in the bore, and the guide vane airfoil being integrally formed with the rotary plate,
the guide vane airfoil extending beyond the rotary plate in such a way that, viewed in a direction of flow of the gas path of the gas turbine, a flag corner of the guide vane airfoil facing the bleed duct is located downstream of a beginning of the inlet opening of the bleed duct, wherein the bleed duct connects a primary gas path to a secondary gas path;
wherein a forward boundary of the inlet opening has a first opening angle with respect to the engine axis or a rearward boundary of the inlet opening has a second opening angle with respect to the engine axis, and wherein the first or second opening angle is between 30° and 60°, viewed in the direction of flow.

18. The gas turbine as recited in claim 1 wherein the variable guide vane and the bleed ducts are located in the compressor of the gas turbine.

19. The gas turbine as recited in claim 18 wherein the compressor is a high-pressure compressor.

20. The gas turbine as recited in claim 1 wherein the flag corner is a virtual flag corner.

21. An aircraft gas turbine comprising the gas turbine as recited in claim 1.

22. The gas turbine as recited in claim 1, wherein the secondary flow path is located radially outside of the at least one casing.

* * * * *